Feb. 7, 1956
B. C. PHILLIPS
2,733,902
CHARGE FORMING DEVICE
Filed July 22, 1952
2 Sheets-Sheet 2
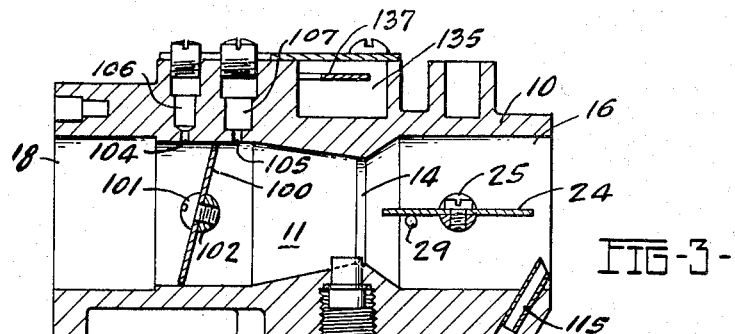
FIG-3-
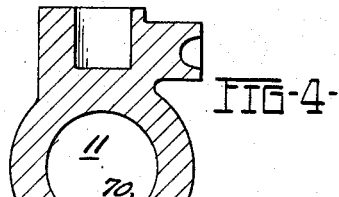
FIG-4-
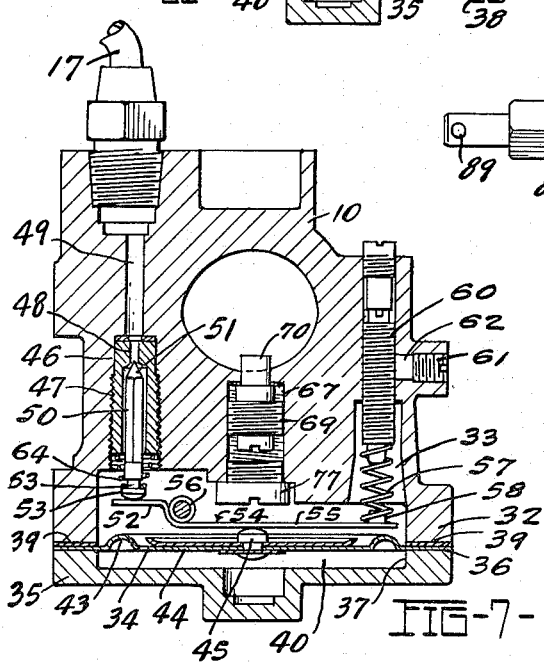
FIG-7-
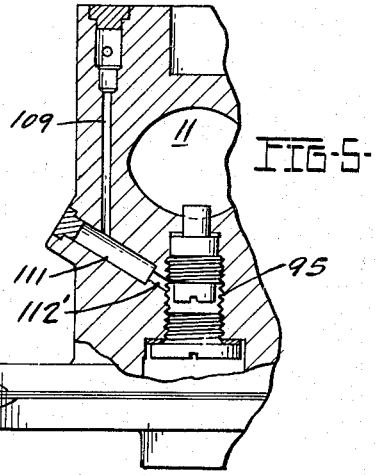
FIG-5-
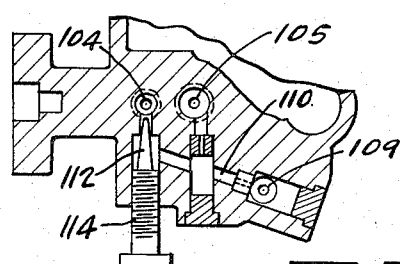
FIG-6-
INVENTOR:
BERNARD C. PHILLIPS.
BY
Harry O. Ernsberger
ATTORNEY United States Patent Office 2,733,902
Patented Feb. 7, 1956

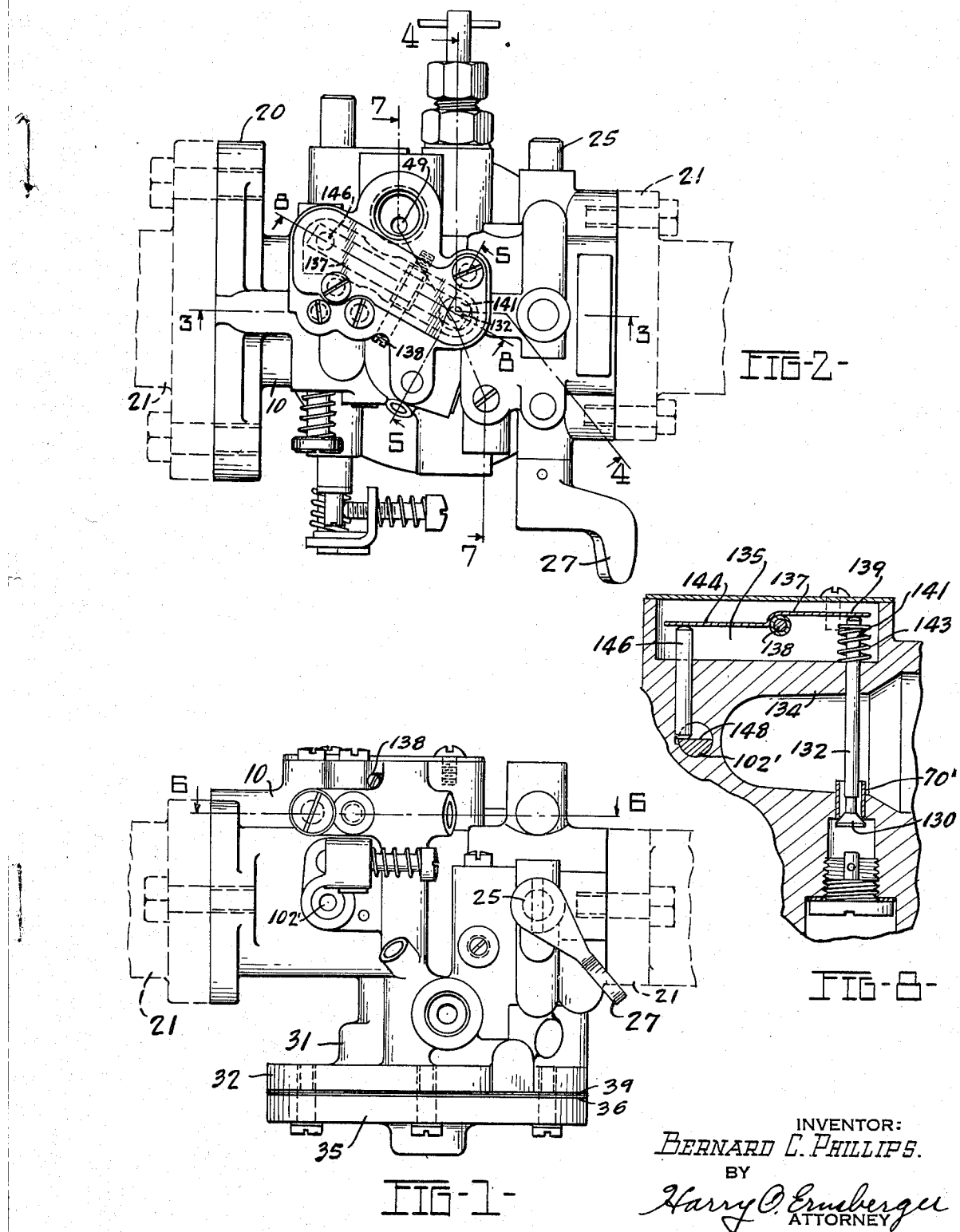

2,733,902

CHARGE FORMING DEVICE

Bernard C. Phillips, Toledo, Ohio, assignor to The Tillotson Manufacturing Company, Toledo, Ohio, a corporation of Ohio Application July 22, 1952, Serial No. 300,288

6 Claims. (Cl. 261—41)

This invention relates to charge forming apparatus for supplying and controlling the delivery of fuel and air mixtures for an internal-combustion engine.

It has been conventional practice for many years to employ charge forming devices or carburetors for internal-combustion engines both for automotive engines and for industrial engines embodying a fluid-controlled or float-controlled valve means for regulating the delivery of liquid fuel to a chamber in a carburetor from which the fuel is subsequently delivered into a passage where it is mixed with air to establish a combustible mixture for the engine. While satisfactory for automotive engines, such devices do not fulfill the requirements for certain industrial engine uses and installations. For example, engines used for powering chain saws are ofttimes operated in inverted or nonvertical positions, and hence a float-controlled fuel regulating means is ineffective under such conditions. When engines equipped with float-controlled carburetors are operated in inclined positions as, for example, in carrying on mowing operations on the side of a hill or on rough terrain, engine failure results by reason of the erratic operation of the float-controlled fuel feed mechanism.

Charge forming devices or carburetors have been proposed embodying pressure fuel feed regulators in the form of diaphragms for overcoming difficulties of the above-mentioned character. Diaphragm carburetors have been used to some extent with aviation engines where wide variations in atmospheric pressures are encountered, but such devices are of a very complex and intricate nature, and the atmospheric differentials encountered in varying elevations are conducive to fairly satisfactory operation of such devices. However, attempts at the utilization of diaphragm-controlled devices for industrial engines have in a large measure been unsatisfactory because of the critical factors involved.

The present invention has for an object the provision of a charge forming apparatus for an internal-combustion engine embodying a diaphragm-controlled means for regulating the flow of fuel to a chamber from which it may be delivered to a mixing passage or zone wherein effective regulation may be obtained independently of ambient pressures or relative positions of the engine with which the charge forming apparatus may be used.

Another object of the invention resides in the provision of charge forming apparatus embodying a diaphragm fuel flow control arrangement associated with valve means for controlling the discharge of fuel through supplemental orifices for engine idling purposes and wherein such mechanism is operable irrespective of the relative angular position of the charge forming apparatus.

Another object of the invention resides in an apparatus embodying a diaphragm means for controlling the operation of a fuel flow regulating valve, the components of the mechanism being arranged to reduce the effect of the critical factors so as to obtain a reliably operating diaphragm-controlled mechanism.

Another object of the invention is the provision of a diaphragm-controlled fuel flow regulating means associated with a fuel and air mixing passage or zone whereby fuel may be discharged into the mixing passage or zone in accordance with the needs of the engine connected with the apparatus which is reliable in its operation throughout various operating engine speeds and idling periods of the engine.

Another object of the invention is the provision of a diaphragm-type discharge forming device wherein the linkage or mechanism between the diaphragm and the valve means controlled thereby is of a construction wherein minute deflections or movements of the diaphragm are communicated to the valve to assure smooth and uninterrupted fuel flow to the diaphragm chamber and into the mixing passage whereby the fuel and air mixture remains stable with little or no tendency for the mixture to become alternately rich and lean.

A further object of the invention is the provision of a carburetor wherein fuel is admitted to a carburetor chamber substantially at the same rate that it is delivered into the mixing passage and eliminating appreciable change of the fuel level in the chamber.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a charge forming device or carburetor embodying the invention;

Figure 2 is a top plan view of the construction shown in Figure 1;

Figure 3 is a longitudinal sectional view taken substantially on the line 3—3 of Figure 2;

Figure 4 is a generally transverse sectional view taken substantially on the line 4—4 of Figure 2;

Figure 5 is a fragmentary detail sectional view taken substantially on the line 5—5 of Figure 2;

Figure 6 is a fragmentary sectional view taken substantially on the line 6—6 of Figure 1;

Figure 7 is a vertical sectional view taken substantially on the line 7—7 of Figure 2, and Figure 8 is a detail sectional view taken substantially on the line 8—8 of Figure 2 illustrating a modified form of check valve and operating means therefor.

While the arrangement of my invention is illustrated as embodied in a structure especially adaptable for supplying a fuel and air mixture to an internal-combustion engine of low horsepower especially usable for powering chain saws, lawn mowers and other mechanisms where a float-controlled carburetor is ineffective, it is to be understood that I contemplate the use of the invention with engines of larger types wherever the same may be found to have utility.

Referring to the drawings in detail, the carburetor of the present invention is inclusive of a cast metal body 10 provided with a mixing passage 11, the latter preferably including a Venturi configuration 12, the restriction or choke band thereof being indicated at 14. The Venturi configuration 12 is in communication with an air inlet passage 16 and an outlet passage 18 adapted to convey a fuel and air mixture to an internal-combustion engine (not shown). The carburetor body is provided with a laterally extending flange 20 adjacent the outlet passage 18 which may be connected or secured to an engine manifold or fitting 21 in the manner indicated in broken lines in Figure 2.

The carburetor body adjacent the air inlet of the mixing passage is formed to receive and accommodate a fitting 21 which may be connected with an air filter or cleaner (not shown). Mounted in the air inlet passage 16 is an air control or choke valve in the form of a circular disk 24 securely mounted upon a transversely extending shaft 25, one end of which projects exteriorly of the carburetor body as shown in Figure 2 and supports a manipulating member or finger piece 27. The full open position of the air valve 24 is defined or limited by an abutment pin 29 shown in Figure 3.

The body of the carburetor is provided with a depending portion 31 having a flange 32 integrally formed therewith. The portion 31 is formed with a chamber 33 arranged to receive and contain a quantity of liquid fuel supplied to the carburetor from a supply (not shown). Extending across the chamber 33 is an imperforate membrane or diaphragm 34 forming a wall of the chamber 33 which may be fashioned of thin flexible metal or fabric coated or treated with material unaffected by contact with hydrocarbon fuels to render the fabric impervious.

The peripheral portion 36 of the diaphragm 34 is adapted to lie in contiguous relation with the lower face of the flange 32 formed on the body 31 with a fluid sealing gasket 39 disposed between the diaphragm and the flange 32. The diaphragm is held in place by means of a cover or closure member 35 which has a raised peripheral flange 37 adapted to engage the portion 36 of the diaphragm. A plurality of screws is employed to hold the diaphragm in position.

The closure member 35 is formed with a disk-like shallow chamber 40, the diaphragm 34 forming one wall of the chamber 40. The chamber 33 is in communication with the mixing passage 11 for the discharge of fuel into the passage by means to be hereinafter described.

The purpose and function of the diaphragm 34 and mechanism associated therewith are to regulate and control the flow of liquid fuel from a receptacle or fuel tank into the chamber 33 for subsequent discharge or delivery into the mixing passage. The diaphragm 34 is preferably formed with a circular raised portion 43 to impart flexibility thereto in order to facilitate movement of the diaphragm under variations in pressure. The central portion of the diaphragm may be reinforced by means of a disk 44 secured to the central portion of the diaphragm by means of a headed rivet 45.

The body of the carburetor is formed with a threaded bore 46 within which is disposed a hollow fitting 47 having a restricted passage 48 which communicates with a duct 49 for conveying fuel from a source of supply to the chamber 33. Positioned within the longitudinal channel or bore in the fitting 47 is a valve member 50 of polygonal cross-section, as for example, triangularly shaped in cross-section. The valve member 50 is formed at one end with a cone-shaped or pointed extremity 51 adapted to seat at one end of the restricted passage 48 for interrupting or controlling the flow of liquid fuel into the carburetor chamber 33, the other extremity of the valve member 50 is formed with a head portion 53 adapted to rest upon or contact one arm 52 of a lever member 54, the lever member being pivoted upon a pin or shaft 56 extending into the chamber 33 and carried by the body portion 31. The extremity of the long arm 55 of the lever is engaged by a coil spring 57 which is positioned in engagement with the lever by means of a guide or projection 58. The expansive pressure of the spring 57 may be regulated by an adjusting member or screw 60 threaded into a bore formed in the body portion of the carburetor, the screw 60 being locked in adjusted position by means of a threaded member or screw 61 engaging a member 62 of fiber or soft metal which in turn engages the screw 60 to hold the latter in adjusted position.

The valve member 50 is formed with a recess 63 adjacent the head 53 providing a seat for a conically shaped coil spring 64 which supplies a resilient force tending to bias or urge the valve member 51 away from its seat under certain conditions of operation of the carburetor. The expansive pressure of the spring 64 is much less than the pressure of the spring 57 so that the spring 57 normally seats the valve 51 in closed position. This condition obtains except when a change in position of the diaphragm 34 moves the lever 54 in a counterclockwise direction as viewed in Figure 7 to permit the spring 64 to unseat the valve 51 and admit fuel into the chamber 33. The spring 64 functions to establish instant response of the valve 51 to movements of the diaphragm and avoids liability of the valve to stick in its seat.

The arrangement for conveying and discharging fuel from the chamber 33 into the mixing passage 11 will now be described. Centrally formed in the carburetor body is a threaded bore 67 into which is threaded a fitting 69 provided with a tube or nozzle 70 in communication with the mixing passage 11, the outlet or orifice of the tube discharging fuel into the mixing passage preferably adjacent the restricted zone or choke band 14 of the Venturi configuration forming part of the mixing passage. The fitting 69 is formed with a central passage or duct 71 which communicates with a passage 72 of larger diameter in which is disposed a check valve 74 which may be of the ball type. The lower end of the bore 67 is closed by means of a threaded member 76 having a head portion 77 engaging a gasket 78 to seal the lower end of the bore.

The carburetor body is formed with a boss portion 80 provided with a bore 81 terminating in a restricted passage 83 adjacent the fitting 69 into which extends a needle valve 84. The body 85 of the needle valve extends through a fitting 86 threaded into an opening 87 formed in the boss 80. The fitting 86 is provided with a threaded central bore (not shown) cooperating with a threaded portion (not shown) of the valve body 85 whereby rotation of the valve body 85 causes the needle 84 to be moved axially for regulating the rate of feed of fuel to the main fuel-discharge nozzle 70. A transversely extending pin 89 is supported by the needle body 85 and serves as a means facilitating manipulation and adjustment of the needle valve 84.

Formed in the carburetor body is a vertically disposed passage 92 in communication with a horizontal passage 93, the latter being in communication with a passage 94 opening into the bore 81 containing the needle valve 84. The fitting 69 has a portion of reduced diameter to provide a space 95 for facilitating flow of fuel from the valved passage 83 to the space or chamber 97 provided between the fitting 69 and the closure member 77. Through this arrangement, fuel from chamber 33 is conveyed for discharge into the mixing passage 11 through the following: vertical passage 92, horizontal passages 93 and 94, passage 83, annular passage 95, chamber 97, passage 71 and nozzle 70.

The carburetor of the invention includes means for supplying fuel to the mixing passage for engine idling purposes. A throttle valve 100 in the form of a circular disk is disposed in the mixing passage and is secured by means of a screw 101 to a transversely extending shaft 102. A cylindrical wall of the mixing passage in proximity to the throttle 100 is formed with supplemental fuel-discharge orifices 104 and 105 for engine idling and low-speed operation, the orifices 104 and 105 communicating with ducts 106 and 107 in the carburetor body. For purposes of explanation, the orifice 104 is herein referred to as a primary idling orifice and the outlet 105 referred to as a secondary or low-speed orifice. The ducts 106 and 107 are in communication with a vertically disposed passage 109 by means of a passage or duct 110 shown in Figure 6. The passage 109 is in communication with the annular chamber 95 through an angularly disposed duct 111.

The primary idling orifice arrangement includes a needle valve 112 carried by a threaded member 114, the latter being threaded into an opening in the carburetor body. By rotating member 114, the relative position of the needle valve 112 may be adjusted to regulate or control the fuel flow into the mixing passage through the primary idling orifice 104.

The air chamber 40 formed in the closure 35 and beneath the diaphragm 34 is preferably vented into the air inlet passage by means of a tube 115 and passages 116 and 117 as shown in Figure 3. It is conventional practice to equip a carburetor at the air inlet portion thereof with an air cleaner or air filter for separating or removing dust and foreign particles from the air stream entering the passage 16. Under severe conditions of operation of the engine in dust-laden environment, the air cleaner may become partially clogged with foreign matter. The air vent to the chamber 40 not only serves to equalize the pressure at one side of the diaphragm but also serves to stabilize the air and fuel mixture when the air cleaner has become partially clogged with foreign matter. As shown in Figure 3, the orifice of the vent tube is therefore preferably slanted or faced toward the air stream entering the inlet passage 16, such arrangement preventing the mixture becoming enriched when the air flow is reduced from its normal flow through an impeded air cleaner.

The diaphragm carburetor of this invention is more especially adapted to be utilized in conjunction with a fuel tank or receptacle which is pressurized by air pressure contained in the fuel receptacle or by elevating the fuel supply tank or receptacle a sufficient distance above the carburetor to provide a pressure head for the fuel at the carburetor. It has been found that the pressure or tension in the spring 57 should be adjusted to exert a higher pressure than that impressed upon the fuel supply.

As a typical, practical illustration of a satisfactory pressure differential, if the fuel pressure is at a value of three pounds per square inch, then the spring 57 should be adjusted to exert a two or three pounds greater pressure upon the needle valve 50. In order that the fuel flow to the carburetor be effectively and efficiently controlled by the operation of the valve construction 50, 51 responsive to the position of the diaphragm 34, it is desirable that the pressure or expansive force of the spring 57 be adjusted to exert sufficient pressure to normally hold the valve 51 in closed position. The pressure of spring 57 should not, however, be too high as an excessive pressure would prevent or interfere with movement of the diaphragm in response to subatmospheric pressures developed in the mixing passage during engine operation. By adjusting the pressure of the spring 57 to the required value, the diaphragm will be responsive to variations in pressure in the mixing passage. As fuel is delivered into the mixing passage from the chamber 33, the position of the diaphragm is changed and such change controls the extent of opening of the inlet valve 51 to replace the fuel in chamber 33 delivered to the mixing passage. By reason of the pressure of the spring 57, leakage or seepage of fuel past the valve 51 is prevented under normal operating conditions, and the spring 64 insures against the valve 51 sticking in the valve seat. The use of the two springs 57 and 64 in conjunction with the lever member 54 assures an instant response of the fuel valve to the slightest movement of the diaphragm.

The operation of the form of carburetor of my invention is as follows: During the operation of an engine equipped with a carburetor of the present invention when operating at speeds above idling speed, fuel is delivered into the choke band or restricted zone 14 of the Venturi 11 through the main fuel orifice or nozzle 70. The fuel enters the carburetor through a tube 17 connected to a pressurized fuel supply. Assuming that the engine is operating in a normal speed range and fuel is being delivered into the mixing passage through the nozzle 70, the diaphragm 34 is moved from its position as shown in Figure 7 by reason of the fuel in the chamber 33 being depleted.

As the diaphragm 34 is flexed upwardly due to the pressure differential on opposite sides thereof, member 45 engages arm 55 of the lever 54 causing the latter to move in a counterclockwise direction around the axis of pin 56. This movement of the lever compresses the spring 57 and permits movement of the needle valve 51 away from its seat at the passage 48 under the influence of the spring 64. With valve 51 opened, fuel flows from the pressurized supply tank through the passages 49, 48, along the valve body 50 into the chamber 33, thence through the passages 92, 93 and 94 past the needle valve or metering means 84 through the passage 83 into chambers 95 and 97, thence upwardly through passage 71 around the ball check member 74 and into the mixing passage 11 through the tube or nozzle 70. The diaphragm 34 is returned to its normal position through the equalization of pressure as fuel flows into the chamber 33. When the chamber 33 receives fuel in an amount to equalize the pressures acting on the diaphragm and returns to its normal position, the needle valve 51 is closed under pressure of the spring 57 acting through the lever 54.

When the engine is operating at a substantially constant speed, the fuel delivered into the mixing passage will be at a substantially constant rate, the needle valve 51 remaining in a position to permit fuel to flow to the chamber 33 at the rate that it is being withdrawn therefrom and delivered into the mixing passage.

When the engine is running at a comparatively slow speed or is idling, fuel is delivered into the mixing passage through the low-speed or idling orifice 104 (shown in Figures 3 and 6). The fuel is delivered to the orifice 104 through the channels or ducts 110, 109 and 111 from the fuel contained in the annular chamber 95 surrounding the fitting 69. During idling of the engine, the secondary low-speed orifice 105 normally admits a small amount of air from the mixing passage which mixes with the fuel in the channel 110 so that the idling orifice 104 delivers a mixture rich in fuel. This condition obtains when the throttle valve 100 is in closed or substantially closed position as shown in Figure 3.

When the throttle valve 100 is moved slightly toward open position, the pressure is further reduced in the mixing passage and becomes effective on the secondary orifice 105, and both the primary and secondary orifices discharge fuel into the mixing passage to take care of the increased requirements of the engine until the engine reaches a speed at which the main nozzle 70 delivers fuel to the Venturi of the mixing passage.

When the idling orifice is discharging fuel into the mixing passage 11, a near-atmospheric pressure exists in the Venturi of the mixing passage by reason of the throttle valve being in substantially closed position. Thus during idling of the engine, the main fuel-discharge orifice or nozzle 70 is under a slight subatmospheric pressure. As the idling orifice 104 is at the engine side of the throttle valve 100, there would normally exist a tendency for air to be bled from the mixing passage downwardly through the main orifice discharge tube 70 and into the passages conveying fuel to the idling orifice 104. In order to avoid air being bled into the idling fuel supply other than that entering the idle supply through the fuel idling orifice 105, the check means in the form of a ball valve 74 disposed in the main fuel-discharge system as shown in Figure 2 engages the seat adjacent the fuel passage 71 to prevent downward or reverse flow of air through the main orifice construction to the fuel supply channels connected with the idling orifice 104. It is obvious as is shown in the drawings that the fuel connections between the fuel chamber and the idling and main fuel system are such that the check valve also prevents adverse influence upon the pressure in the fuel chamber during carburetor operation.

The tension or pressure of spring 57 should be adjusted to slightly overbalance the pressure of the fuel head or pressurized fuel supply in order that the flexing movement of the diaphragm 34 downwardly under pressure of the fuel flowing into the chamber 33 assures a closing of the valve 51 when the requirements of the fuel chamber 33 have been satisfied. When fuel is discharged from the chamber 33 into the mixing passage by way of the main, idle or secondary fuel orifices, the negative pressure obtaining in the mixing passage is communicated to the chamber 33 causing the diaphragm 34 to be flexed upwardly to move the lever 54 about its fulcrum in a counterclockwise direction as viewed in Figure 7. Upon downward movement of the short arm 54 of the lever, the small coil spring 64 exerts a biasing force to open the valve 51, that is, to move the valve 51 away from its seat at the fuel passage 48 whereby flow of fuel into the chamber 33 is resumed until the diaphragm 34 again moves to a position with respect to the lever 54 whereby the pressure of the spring 57 causes the inlet valve 51 to close.

The chamber 40 at the opposite side of the diaphragm, being vented to the air inlet 16 adjacent the mixing passage, assures an equalized pressure at opposite sides of the diaphragm 34 to insure that the diaphragm properly responds to pressure changes in order to provide for stable operation of the charge forming device.

Figure 8 illustrates a modified arrangement of check valve for the main fuel-discharge system to prevent air bleeding into the passages supplying fuel to the idling orifice during operation of the latter. The form of device illustrated in Figure 8 is adapted to be positively operated through an interconnection with the throttle operating shaft 102'. In this form of construction the fitting 69 is omitted, the main fuel orifice or nozzle 70' extending into the space occupied by the fitting 69. The valve construction is inclusive of a valve head 130 secured upon the lower extremity of a valve stem or body 132, the valve head 130 being preferably of conical shape and seating against the lower end of the main fuel-discharge tube 70'. The valve stem 132 extends upwardly through a wall portion 134 of the carburetor body and into a chamber 135. Mounted within the chamber 135 is a lever 137 pivotally supported upon a shaft or pin 138. One arm 139 of the lever engages the upper end of the valve stem 132. A disk or washer 141 is secured to the valve stem and an expansive coil spring 143 disposed between the disk 141 and portion 134 of the carburetor body to resiliently bias the check valve 130 toward closed position. The other arm 144 of the lever 137 engages the upper end of a pin or strut 146, the lower end of the strut resting against a diametrically disposed flat surface 148 formed upon the throttle valve supporting shaft 102'. As shown in Figure 8, the strut 146 engages the throttle shaft at one side of the center of the latter. By this arrangement, movement of the throttle shaft toward throttle-opening position elevates the strut 148 causing a swinging movement of the lever 137 in a clockwise direction as viewed in Figure 8 and exerting a downwardly acting force upon the valve stem 132 to move the valve 130 away from its seat. Through its type of mechanical linkage arrangement, the check valve is closed by the pressure of the spring 143 to prevent air bleeding into the idle fuel-passage system whenever the throttle valve is in closed position. This check valve arrangement serves to perform the same functions as the check valve arrangement shown in Fig. 4 and herein described in the specification. This type of check valve arrangement enables the use of the carburetor with an engine in any angular position including an inverted position. The form of the invention as shown in Figure 2 embodying the ball valve 74 may be used in angular positions with respect to a vertical position, but such arrangement does not promote a continued stability of operation during idling operations with the engine in inverted or substantially inverted relation for the reason that the ball 74 is influenced by gravity and tends to move away from its valve-closing position when the carburetor is in substantially inclined or inverted position.

When a ball check is used, it is advisable that the passage 112' (see Figure 5) be restricted as this restriction has the effect of reducing the volume of the rather high suction effective at the lower side of the check valve so that an ample supply of fuel may flow through the main fuel passages without creating an undue subatmospheric pressure or suction in the zone immediately below the ball valve. The ball valve 74 is therefore arranged for reasonably free movement and is readily lifted from its seat by subatmospheric pressure as the throttle is moved toward open position. The subatmospheric pressure, being greatest at the Venturi choke band or restricted zone 14, is quite effective to facilitate flow of fuel around the ball valve 74 and into the mixing passage. The entrance 96 of the passage 92 into the chamber 33 is of a bell-mouthed shape as this configuration tends to cause any bubbles in the fuel to be drawn into the passageway 92 for discharge with the fuel into the mixing passage. This arrangement avoids the tendency for small bubbles to accumulate and form a larger one which, when moved or carried into the fuel-discharge passages, may cause temporary impairment of the operation of the carburetor.

It is apparent that, within the scope of the invention, modifications and different arrangements may be made other than is herein disclosed, and the present disclosure is illustrative merely, the invention comprehending all variations thereof.

What I claim is:

1. In combination with a charge forming device having a body formed with a mixing passage and a fuel receiving chamber having a single flexible diaphragm defining one wall thereof and a main orifice arranged to deliver liquid fuel from the chamber into the mixing passage and a secondary orifice formed in the wall of the mixing passage, a fuel inlet duct in the body, a fuel inlet control valve having a needle portion extending into the duct and operative to close said duct against fuel pressure in the duct, a fuel well formed in the body, a passage connecting the fuel receiving chamber with the fuel well, means for metering the flow of liquid fuel from said chamber through said passage into the fuel well, a member movably supported in said chamber in constant engagement with the diaphragm, said member having a portion engaging the fuel inlet control valve, a spring engaging said member and normally biasing the member in a direction to close said fuel inlet control valve, said diaphragm being actuated solely by subatmospheric pressure in the mixing passage to move the member in a direction to change the position of the fuel inlet control valve to admit fuel through the duct into the fuel receiving chamber, a channel for supplying fuel from the fuel receiving chamber to the secondary orifice, and valve means arranged to interrupt air flow through the main orifice from the mixing passage into said channel when said secondary orifice is delivering fuel into the mixing passage.

2. In combination with a charge forming device having a body formed with a mixing passage and a fuel receiving chamber having a flexible diaphragm defining one wall thereof and a main orifice arranged to deliver liquid fuel from the chamber into the mixing passage and secondary orifices formed in the wall of the mixing passage, a fuel inlet duct formed in the body, a fuel inlet control valve having a conically shaped needle portion extending into the duct and operative to close said duct against fuel pressure in the duct, a fuel well formed in the body, a passage connecting the fuel receiving chamber with the fuel well, means for metering the flow of liquid fuel from said chamber into the fuel well, a lever pivotally supported in said chamber in constant engagement with the diaphragm, said lever having a portion engaging the fuel inlet control valve, a spring engaging said lever and normally biasing the lever in a direction to close said fuel inlet control valve, said diaphragm being actuated solely by subatmospheric pressure in the mixing passage to move the lever in a direction to change the position of the fuel inlet control valve to admit fuel through the duct into the fuel receiving chamber, a channel for supplying fuel from the fuel receiving chamber to said secondary orifices, and valve means arranged to interrupt air flow through the main orifice from the mixing passage into said channel when said secondary orifices are delivering fuel into the mixing passage.

3. In combination with a charge forming device having a body formed with a mixing passage and a fuel receiving chamber having a flexible diaphragm defining one wall thereof and a main orifice arranged to deliver liquid fuel from the chamber into the mixing passage and idling and low speed orifices in the wall of the mixing passage, a fuel inlet duct formed in the body, a fuel inlet control valve having a conically shaped needle portion extending into the duct and operative to close said duct against fuel pressure in the duct, a fuel well formed in the body, a passage connecting the fuel receiving chamber with the fuel well, adjustable means in said passage for regulating the flow of liquid fuel from said chamber into the fuel well, a lever pivotally supported in said chamber in constant engagement with the diaphragm, said lever having a portion engaging the fuel inlet control valve, a spring engaging said lever and normally biasing the lever in a direction to close said fuel inlet control valve, said diaphragm being actuated solely by subatmospheric pressure in the mixing passage to move the lever in a direction to change the position of the fuel inlet control valve to admit fuel through the duct into the fuel receiving chamber, a channel for supplying fuel from the fuel receiving chamber to said idling and low speed orifices, a fitting disposed in said fuel well, and a check valve in said fitting arranged to interrupt air flow from the mixing passage into said channel when said idling and low speed orifices are delivering fuel into the mixing passage.

4. In combination with a charge forming device having a body formed with a mixing passage including a Venturi and a fuel receiving chamber having a flexible diaphragm defining a wall thereof with a main fuel discharge orifice in the restricted zone of the Venturi and a secondary orifice in a wall of the mixing passage spaced from the main fuel discharge orifice, a fuel inlet duct formed in the body for delivering liquid fuel into the fuel receiving chamber, a control valve having a conically shaped needle portion extending into the duct and operative to close said duct against fuel pressure in the duct, a fuel well formed in the body, a restricted passage connecting the fuel well with the fuel receiving chamber, a lever pivotally supported in said chamber in constant engagement with the diaphragm, a spring engaging said lever and normally biasing the lever in a direction to close said fuel inlet control valve, said diaphragm being actuated solely by reduced pressure in the mixing passage to move said lever in a direction to change the position of the fuel inlet control valve to admit fuel through the duct into the chamber, a channel in communication with the chamber for supplying fuel from the chamber to the secondary orifice, and valve means in the fuel well arranged to interrupt flow of air from the mixing passage into said channel when the secondary orifice is delivering fuel into the mixing passage.

5. In combination with a charge forming device having a body formed with a mixing passage equipped with a throttle valve and including a Venturi and a fuel receiving chamber having a flexible diaphragm defining a wall thereof with a main fuel discharge orifice in the restricted zone of the Venturi and a secondary orifice in a wall of the mixing passage spaced from the main fuel discharge orifice, a fuel inlet duct formed in the body for delivering liquid fuel into the fuel receiving chamber, a control valve having a conically shaped needle portion extending into the duct and operative to close said duct against fuel pressure in the duct, a fuel well formed in the body, a restricted passage connecting the fuel well with the fuel receiving chamber, a lever pivotally supported in said chamber in constant engagement with the diaphragm, a spring engaging said lever and normally biasing the lever in a direction to close said fuel inlet control valve, said diaphragm being actuated solely by reduced pressure in the mixing passage to move said lever in a direction to change the position of the fuel inlet control valve to admit fuel through the duct into the chamber, a channel in communication with the chamber for supplying fuel from the chamber to the secondary orifice, and valve means in the fuel wall and connected with the throttle valve arranged to interrupt flow of air from the mixing passage into said channel when the secondary orifice is delivering fuel into the mixing passage.

6. In combination with a charge forming device having a body formed with a mixing passage including a Venturi and a fuel receiving chamber having a flexible diaphragm defining a wall thereof with a main fuel discharge orifice in the restricted zone of the Venturi and an idling orifice in a wall of the mixing passage spaced from the main fuel discharge orifice, a fuel inlet duct formed in the body for delivering liquid fuel in to the fuel receiving chamber, a control valve having a conically shaped needle portion extending into the duct and operative to close said duct against fuel pressure in the duct, a fuel well formed in the body, a restricted passage connecting the fuel well with the fuel receiving chamber, said passage being formed with an enlarged entrance into the fuel receiving chamber, a lever pivotally supported in said chamber in constant engagement with the diaphragm, a spring engaging said lever and normally biasing the lever in a direction to close said fuel inlet control valve, said diaphragm being actuated solely by reduced pressure in the mixing passage to move said lever in a direction to change the position of the fuel inlet control valve to admit fuel through the duct into the chamber, a channel in communication with the chamber for supplying fuel from the chamber to the idling orifice, and a ball check valve in the fuel well arranged to interrupt flow of air through the main discharge orifice into said channel when the idling orifice is delivering fuel into the mixing passage.

References Cited in the file of this patent

UNITED STATES PATENTS

| 2,156,115 | Gistucci et al | Apr. 25, 1939 |
| 2,339,320 | Carlson et al | Jan. 18, 1944 |
| 2,345,168 | Wirth et al | Mar. 28, 1944 |
| 2,445,097 | Wirth | July 13, 1948 |
| 2,568,987 | Brunner | Sept. 25, 1951 |
| 2,569,782 | Sloane | Oct. 2, 1951 |

FOREIGN PATENTS

| 311,708 | Italy | Oct. 9, 1933 |
| 515,801 | France | Nov. 29, 1920 |
| 985,460 | France | Mar. 14, 1951 |